United States Patent
Bannai et al.

(10) Patent No.: US 12,339,408 B2
(45) Date of Patent: Jun. 24, 2025

(54) RADIATION IMAGING APPARATUS AND RADIATION IMAGING SYSTEM

(71) Applicant: CANON KABUSHIKI KAISHA, Tokyo (JP)

(72) Inventors: Ryunosuke Bannai, Kanagawa (JP); Tetsunori Ojima, Kanagawa (JP); Kentaro Fujiyoshi, Irvine, CA (US); Ryosuke Miura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 18/166,518

(22) Filed: Feb. 9, 2023

(65) Prior Publication Data

US 2023/0258828 A1    Aug. 17, 2023

(30) Foreign Application Priority Data

Feb. 16, 2022 (JP) .................................. 2022-022306
Jan. 25, 2023 (JP) .................................. 2023-009593

(51) Int. Cl.
*G01T 1/20* (2006.01)

(52) U.S. Cl.
CPC .......... *G01T 1/2018* (2013.01); *G01T 1/2002* (2013.01)

(58) Field of Classification Search
None
See application file for complete search history.

(56) References Cited

U.S. PATENT DOCUMENTS

| | | | |
|---|---|---|---|
| 8,878,972 B2 | 11/2014 | Wayama | |
| 9,270,903 B2 | 2/2016 | Wayama | |
| 9,277,896 B2 | 3/2016 | Ofuji | |
| 9,423,513 B2 | 8/2016 | Watanabe | |
| 9,521,347 B2 | 12/2016 | Kawanabe | |
| 9,625,585 B1 | 4/2017 | Yokoyama | |
| 9,661,240 B2 | 5/2017 | Fujiyoshi | |
| 9,675,307 B2 | 6/2017 | Ofuji | |
| 9,726,767 B2 | 8/2017 | Kawanabe | |
| 9,835,732 B2 | 12/2017 | Fujiyoshi | |
| 9,838,638 B2 | 12/2017 | Furumoto | |

(Continued)

FOREIGN PATENT DOCUMENTS

JP    2021-78050 A    5/2021

OTHER PUBLICATIONS

U.S. Appl. No. 18/153,844, Shuichi Fujita filed Jan. 12, 2023.

*Primary Examiner* — Edwin C Gunberg
(74) *Attorney, Agent, or Firm* — VENABLE LLP

(57) ABSTRACT

A radiation imaging apparatus comprising pixels, a driver controlling the pixels via driving lines, a readout circuit reading out, via column signal lines, signals from the pixels and a detector detecting irradiation information of radiation separately from a radiation image, is provided. Each of the column signal lines is connected to pixels arranged on two pixel columns. The pixels include a first pixel and a second pixel, whose sensitivities are different from each other. The first and second pixels are connected to a common column signal line and are connected to driving lines different from each other. When detecting the irradiation information, the driver drives the first and second pixels at timings different from each other, and the detection circuit detects the irradiation information based on signals output from the first and second pixels.

17 Claims, 8 Drawing Sheets

(56) References Cited

U.S. PATENT DOCUMENTS

| | | |
|---|---|---|
| 9,948,871 B2 | 4/2018 | Wayama |
| 9,977,135 B2 | 5/2018 | Yokoyama |
| 10,068,943 B2 | 9/2018 | Fujiyoshi |
| 10,473,801 B2 | 11/2019 | Kawanabe |
| 10,537,295 B2* | 1/2020 | Watanabe ............ A61B 6/4233 |
| 10,634,800 B2 | 4/2020 | Yokoyama |
| 10,914,849 B2 | 2/2021 | Ofuji |
| 11,067,706 B2 | 7/2021 | Furumoto |
| 11,083,430 B2 | 8/2021 | Sato |
| 11,090,018 B2 | 8/2021 | Watanabe |
| 11,157,059 B2 | 10/2021 | Yokoyama |
| 11,243,314 B2 | 2/2022 | Fujiyoshi |
| 11,280,919 B2 | 3/2022 | Takenaka |
| 11,294,078 B2 | 4/2022 | Miura |
| 11,402,518 B2 | 8/2022 | Ryu |
| 11,487,027 B2 | 11/2022 | Watanabe |
| 11,630,220 B2 | 4/2023 | Ryu |
| 2021/0141105 A1* | 5/2021 | Ofuji ................... H04N 25/617 |
| 2022/0075085 A1 | 3/2022 | Kawanabe |
| 2022/0196859 A1 | 6/2022 | Fujiyoshi |
| 2022/0334269 A1 | 10/2022 | Miura |
| 2022/0334272 A1 | 10/2022 | Okada |
| 2022/0370026 A1 | 11/2022 | Ueno |
| 2022/0401054 A1 | 12/2022 | Taya |

\* cited by examiner

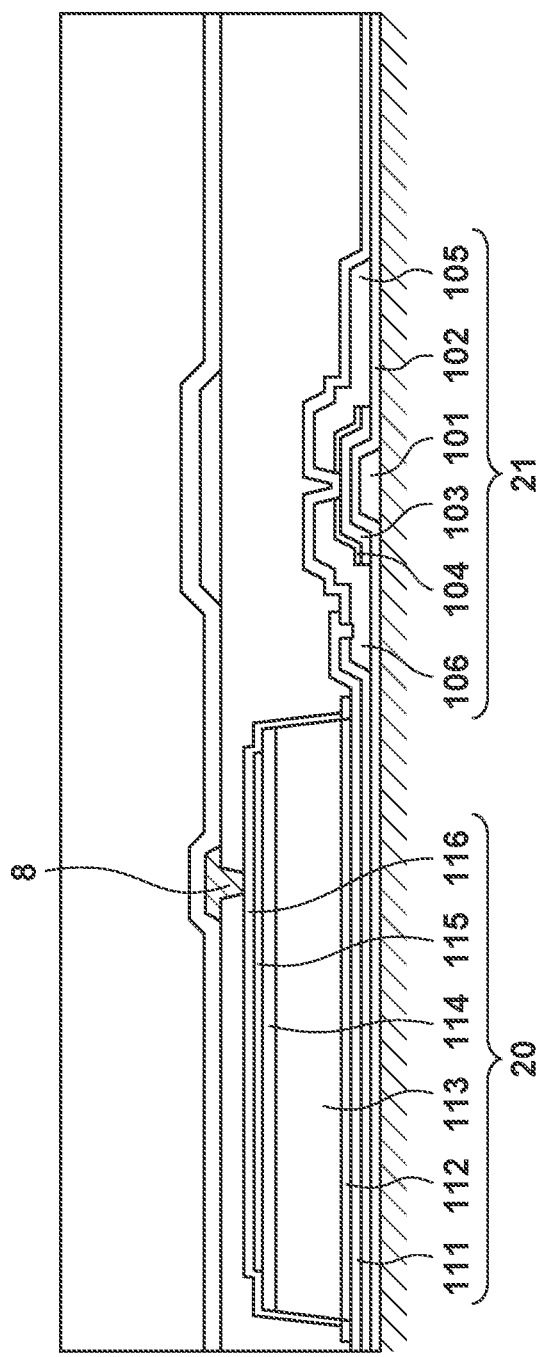
F I G. 2B
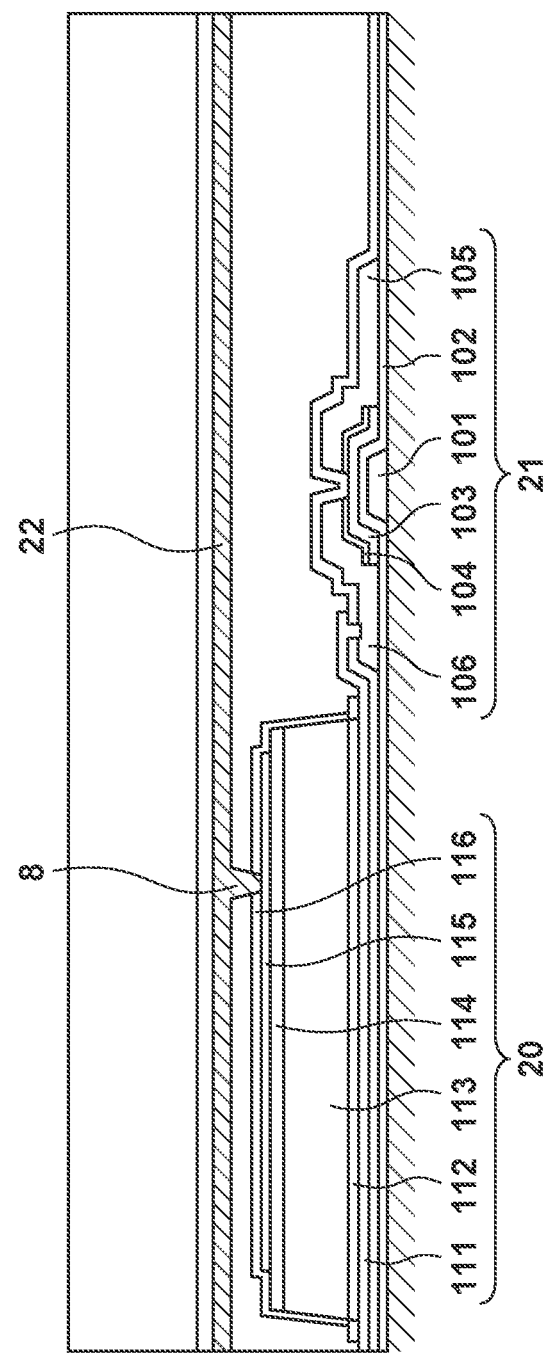
F I G. 2C

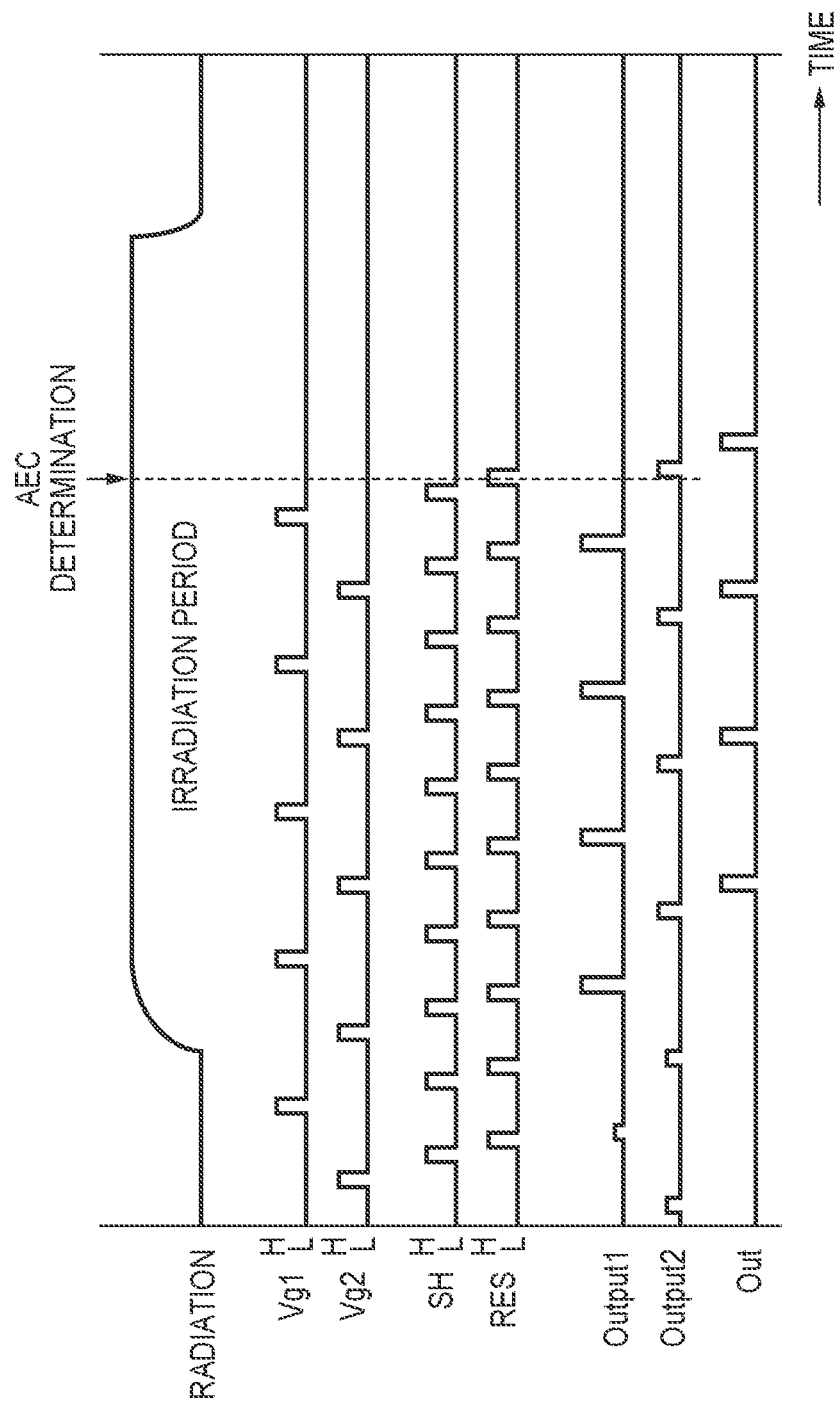

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

There are widely used radiation imaging apparatuses using a Flat Panel Display (FPD) in which a driving circuit and a readout circuit, which are configured to drive pixels or read out signals, are connected to a sensor board including a plurality of pixels configured to change incident radiation into an electrical signal and arranged in a two-dimensional matrix. Since analog amplifiers, analog/digital (A/D) conversion circuits, and the like are integrated at a high density, the readout circuit is expensive and accounts for a large proportion of the member cost of the radiation imaging apparatus. Japanese Patent Laid-Open No. 2021-078050 discloses making two pixels adjacent to each other share a signal line for outputting a signal, thereby reducing the circuit scale of a readout circuit connected to signal lines.

SUMMARY OF THE INVENTION

As multiple functions of a radiation imaging apparatus, the start or end of radiation irradiation is detected by detecting the irradiation information of radiation that enters the radiation imaging apparatus, and Automatic Exposure Control (AEC) is performed by detecting the dose of incident radiation. To accurately detect the radiation irradiation or the radiation dose, it is necessary to accurately detect the irradiation information of radiation.

Several embodiments of the present invention provide a technique advantageous in improving the detection accuracy of irradiation information while reducing the circuit scale of a readout circuit.

According to some embodiments, a radiation imaging apparatus comprising: a plurality of pixels arranged to form a plurality of rows and a plurality of columns; a driving circuit configured to control the plurality of pixels via a plurality of driving lines extending in a row direction; a readout circuit configured to read out, via a plurality of column signal lines, signals generated by the plurality of pixels; and a detection circuit configured to detect irradiation information of radiation separately from a radiation image based on the signals read out by the readout circuit, wherein each of the plurality of column signal lines is connected to pixels arranged on two pixel columns adjacent to each other in the row direction in the plurality of pixels, the plurality of pixels include a first pixel and a second pixel, whose sensitivities to radiation are different from each other, the first pixel and the second pixel are connected to a common column signal line in the plurality of column signal lines, and are connected to driving lines different from each other in the plurality of driving lines, and when detecting the irradiation information, the driving circuit is configured to drive the first pixel and the second pixel at timings different from each other, and the detection circuit is configured to detect the irradiation information based on a signal output from the first pixel and a signal output from the second pixel, is provided.

Further features of the present invention will become apparent from the following description of exemplary embodiments (with reference to the attached drawings).

BRIEF DESCRIPTION OF THE DRAWINGS

FIGS. 2A to 2C are views showing an example of the configuration of pixels of the radiation imaging apparatus shown in FIG. 1A;

FIG. 3 is a timing chart showing an example of the operation of the radiation imaging apparatus shown in FIG. 1A;

DESCRIPTION OF THE EMBODIMENTS

Figure 1A:
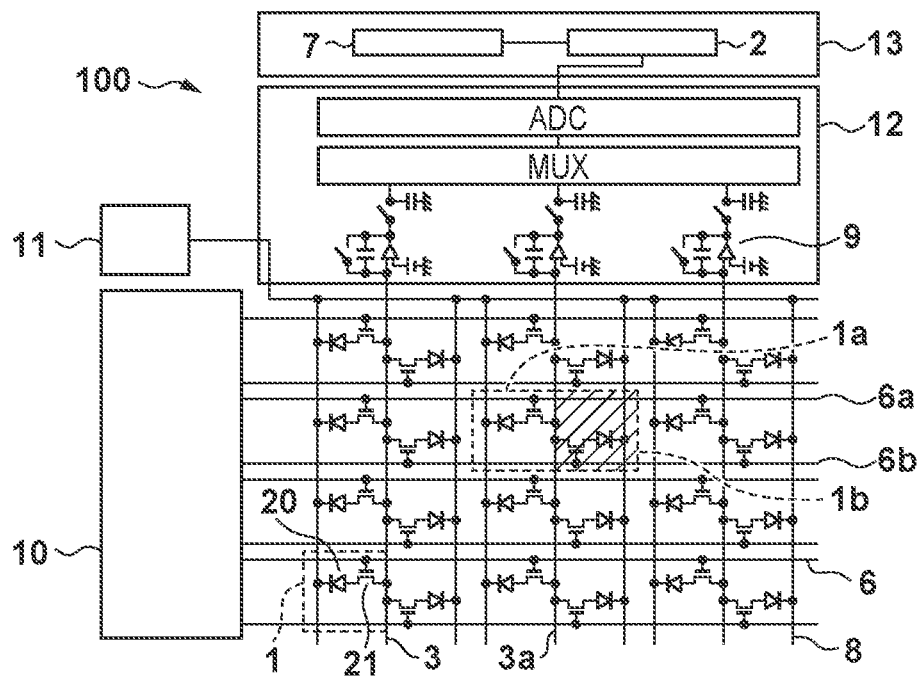
FIGS. 1A to 1C are views showing an example of the configuration of a radiation imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Radiation according to the present invention can include not only α-rays, β-rays, and γ-rays that are beams generated by particles (including photons) emitted by radioactive decay but also beams having equal or more energy, for example, X-rays, particle rays, and cosmic rays.

A radiation imaging apparatus according to an embodiment of the present disclosure will be described with reference to FIGS. 1A to 7. FIG. 1A is an equivalent circuit diagram showing an example of the configuration of a radiation imaging apparatus 100 according to several embodiments of the present disclosure. The radiation imaging apparatus 100 includes a plurality of pixels 1 arranged to form a plurality of rows and a plurality of columns, a driving circuit 10, a readout circuit 12, a detection circuit 13, and a power supply circuit 11. Hereinafter, to indicate a specific one of the plurality of pixels 1, a suffix is added after reference numeral, like pixel 1"a". If discrimination is not particularly needed, it will simply be referred to as "pixel 1". This also applies to the remaining constituent elements.

The driving circuit 10 controls the plurality of pixels 1 via a plurality of driving lines 6 extending in the row direction (the horizontal direction in FIG. 1A). The driving circuit 10 includes a shift circuit and the like, and sequentially causes the plurality of pixels 1 to output signals via the plurality of driving lines 6 in accordance with a start signal or a clock signal transferred from a control circuit (not shown).

The readout circuit 12 reads out, via a plurality of column signal lines 3, the signals generated by the plurality of pixels 1. More specifically, the signals of the pixels 1 driven by the driving circuit 10 via the driving lines 6 are read out by the readout circuit 12. The readout circuit 12 includes amplification circuits 9, a multiplexer MUX, and an analog/digital conversion circuit ADC. The readout circuit 12 analog/digital-converts the signals generated by the pixels 1, and sequentially transfers digital signals according to the analog signals generated by the pixels 1 to the detection circuit 13. In this embodiment, each of the plurality of column signal lines 3 is connected to, in the plurality of pixels 1, the pixels 1 arranged on two pixel columns that are adjacent to each other in the row direction. If one column signal line 3 is shared by two pixel columns, the number of amplification circuits 9 in the readout circuit 12 and the circuit scale of the multiplexer MUX are suppressed. As a result, the circuit scale of the readout circuit 12 can be reduced in the radiation imaging apparatus 100.

The detection circuit 13 detects the irradiation information of radiation separately from a radiation image based on a signal read out by the readout circuit 12. The irradiation information of radiation different from the radiation image can be information representing the start or end of radiation irradiation and the information of the dose of incident radiation. If the detection circuit 13 detects the irradiation information of radiation, the radiation imaging apparatus 100 can incorporate an Automatic Exposure Control (AEC) function. Detection of irradiation information can be executed by, for example, an arithmetic circuit 2 of the detection circuit 13. The arithmetic circuit 2 may be configured to include, for example, a processor such as a CPU. If the processor of the arithmetic circuit 2 executes a program stored in a storage circuit 7 such as a RAM or a ROM, the operation of the detection circuit 13 can be executed. The arithmetic circuit 2 may be formed by a dedicated circuit such as an Application Specific Integrated Circuit (ASIC). Also, the detection circuit 13 may generate data for a radiation image based on the signals output from the plurality of pixels 1. The radiation image data can be transferred to a monitor outside the radiation imaging apparatus 100 and displayed as a captured radiation image on the monitor.

The power supply circuit 11 supplies power to the constituent elements such as the driving circuit 10, the readout circuit 12, and the detection circuit 13 in the radiation imaging apparatus 100. Also, the power supply circuit 11 supplies, to the pixels 1 via bias lines 8, a bias voltage used by the pixels 1 to convert incident radiation into an electric charge signal.

In the configuration shown in FIG. 1A, pixels 1 of 4 rows×6 columns are shown. However, the present invention is not limited to this, and more pixels 1 can be arranged in the radiation imaging apparatus 100. The plurality of pixels 1 include pixels 1a and 1b used to allow the detection circuit 13 to detect the irradiation information of radiation separately from a radiation image. The sensitivities of the pixels 1a and 1b to radiation are different from each other. A description will be made here assuming that the pixel 1a has a higher sensitivity to radiation than the pixel 1b. The pixels 1a and 1b are connected to a common column signal line 3a in the plurality of column signal lines 3, and are connected to driving lines 6a and 6b different from each other in the plurality of driving lines 6, respectively. As will be described later in detail, to, for example, execute AEC, the detection circuit 13 detects, based on a signal output from the pixel 1a and a signal output from the pixel 1b, the irradiation information of radiation such as the start of radiation irradiation, the end of irradiation, and the information of the dose of incident radiation separately from a radiation image.

As shown in FIG. 1A, each pixel 1 includes a conversion element 20 configured to convert radiation into an electric charge, and a switch element 21 configured to output a signal according to the converted electric charge to the column signal line 3. The column signal line 3 can be arranged near the conversion element 20 of the pixel 1. For this reason, a non-negligible parasitic capacitance is formed between the column signal line 3 and the electrode of the conversion element 20, and crosstalk that transmits the electric charge of the conversion element 20 of the pixel 1 to the column signal line 3 via the parasitic capacitance occurs.

When reading out a signal for obtaining irradiation information from the pixel 1a, an electric charge is accumulated in the electrode of the conversion element 20 of the pixel 1 by incident radiation, and a signal derived from crosstalk is transmitted to the column signal line 3a via the parasitic capacitance. Similarly, when reading out a signal for obtaining irradiation information from the pixel 1b, a signal derived from crosstalk is transmitted to the column signal line 3a via the parasitic capacitance. The two signals derived from crosstalk are signals for the same column signal line 3a and therefore have substantially the same amount. Hence, by obtaining the difference between the signal output from the pixel 1a and the signal output from the pixel 1b, the component derived from the crosstalk can be suppressed in the signal output from the pixel 1a. That is, the accuracy of irradiation information detection by the detection circuit 13 improves. As a result, in the radiation imaging apparatus 100, the accuracy of the function such as AEC executed using irradiation information improves.

Also, the signal read out from the pixel 1 can include an offset component derived from elements such as a transistor arranged in the amplification circuit 9 in the readout circuit 12. The characteristic of the offset component can change due to a temperature change during driving or a use environment. On the other hand, since the pixels 1a and 1b used to allow the detection circuit 13 to detect irradiation information read out the signals from the same column signal line 3a, the influence of the offset component can be reduced by obtaining the difference between the signal output from the pixel 1a and the signal output from the pixel 1b. Hence, the accuracy of detecting, by the detection circuit 13, irradiation information to be used for the AEC function improves, and as a result, in the radiation imaging apparatus 100, the accuracy of the function such as AEC executed using irradiation information improves.

Figure 2A:
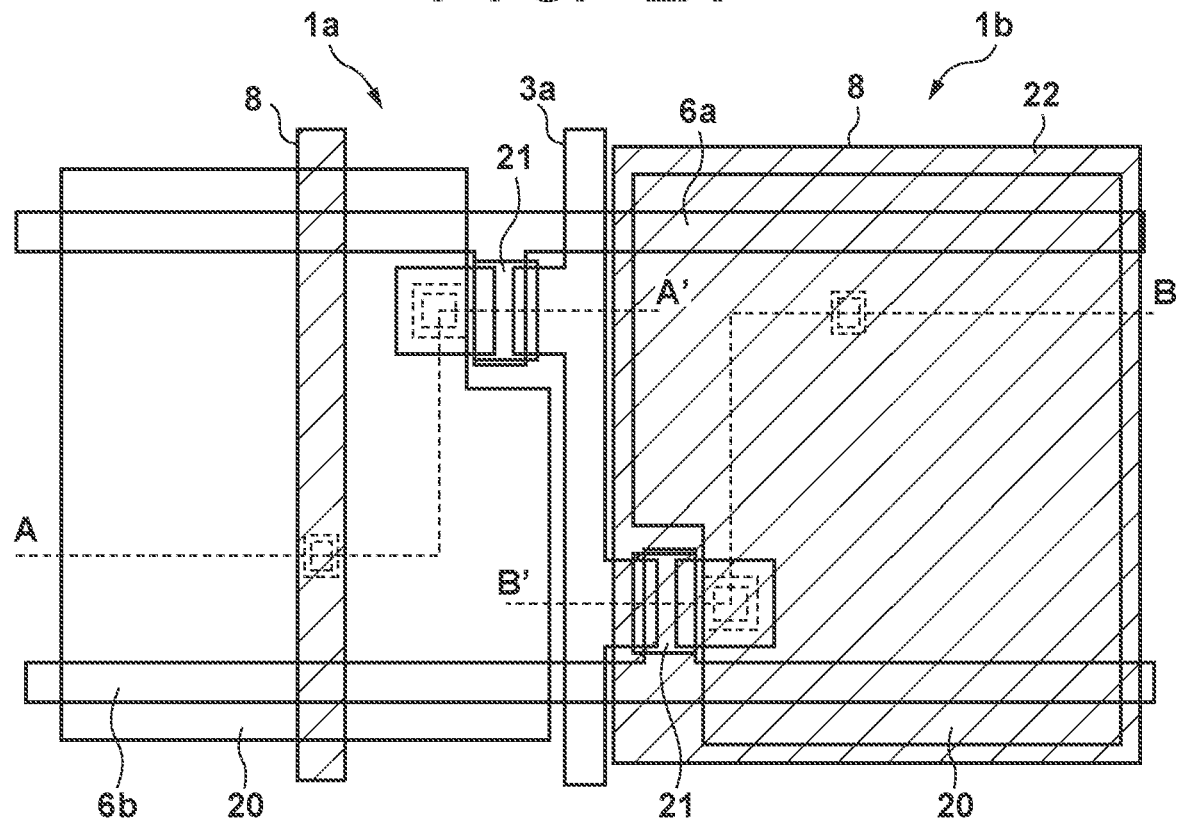

In the configuration shown in FIG. 1A, in the plurality of pixels 1, two pixels 1 that are adjacent to each other in the row direction and are connected to the common column signal line 3 have a configuration of point symmetry across the common column signal line 3 (details are shown in FIG. 2A). The point of symmetry may be, for example, the intersection between a line that connects the geometrical centroids of electrodes (for example, electrodes 111 or electrodes 115 to be described later) provided in the conversion elements 20 of the two pixels 1 and the center line of the column signal line 3 in the column direction (the vertical direction in FIG. 1A). In this embodiment, as shown in FIG. 1A, the pixels 1a and 1b used to detect irradiation information are arranged on the same row, and have a relationship of point symmetry across the common column signal line 3a. Hence, if a misalignment or the like occurs when forming the switch elements 21, the signal output from the pixel 1a and the signal output from the pixel 1b may include different offset components. In this case, offset data obtained without radiation irradiation is stored in the storage circuit 7 or the like in advance, thereby reducing the offset components derived from the misalignment.

Figure 1B:
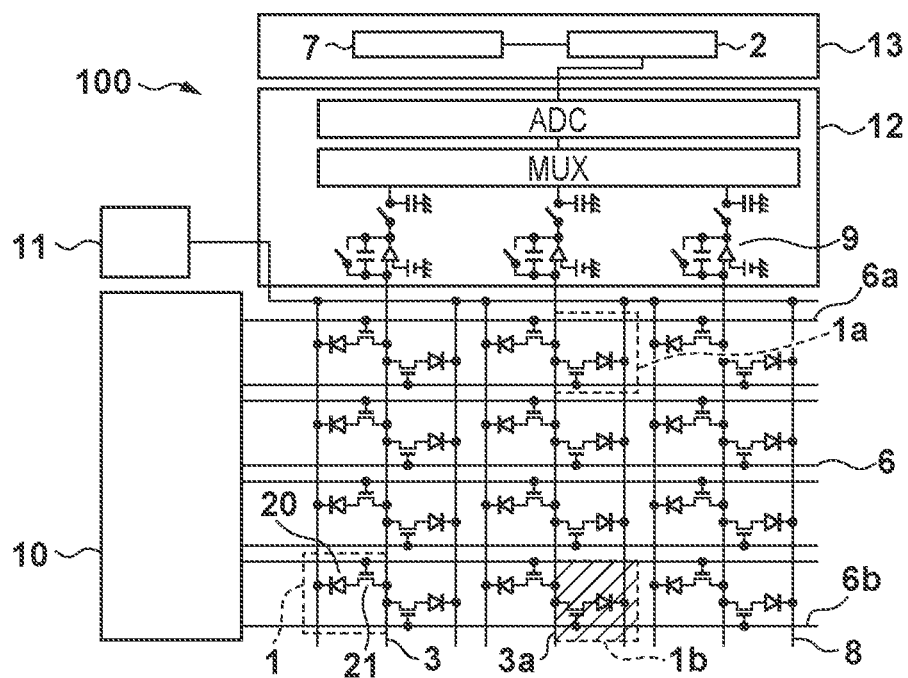

The pixels 1a and 1b used to detect the irradiation information of radiation separately from a radiation image need not always be adjacent to each other in the row direction if these are connected to the common column signal line 3a. For example, as shown in FIG. 1B, the pixels 1a and 1b may be arranged on the same column. If the pixels have the configuration shown in FIG. 1B, the offset components derived from a misalignment are substantially the same as compared to a case where the pixels 1a and 1b have the configuration of point symmetry as shown in FIG. 1A. Hence, the influence of the offset components derived from the misalignment can be suppressed only by acquiring the difference between the signal output from the pixel 1a and the signal output from the pixel 1b.

Figure 1C:
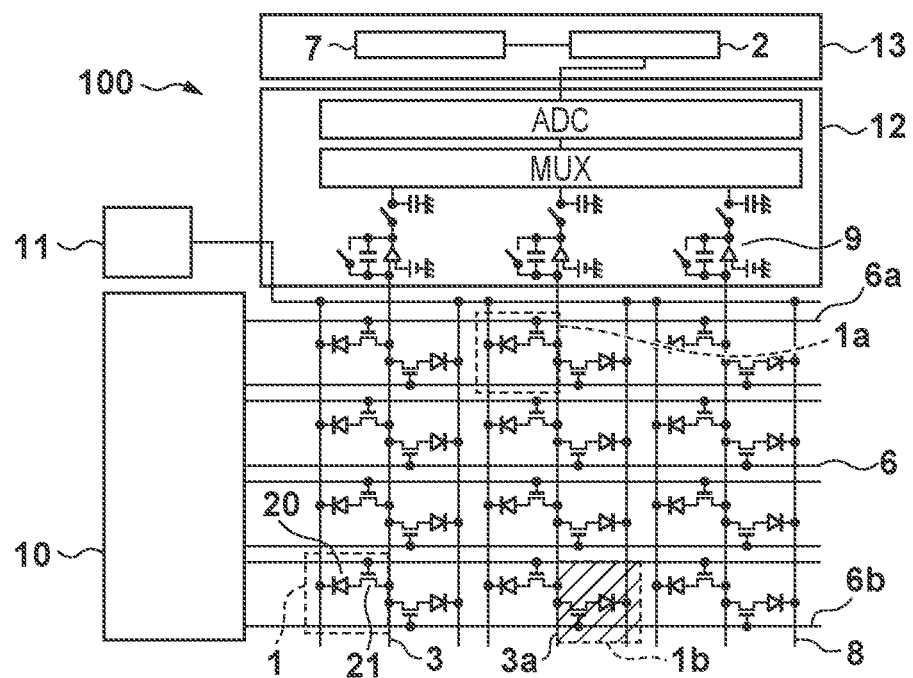

Also, for example, as shown in FIG. 1C, the pixels 1a and 1b may be arranged on rows different from each other and on columns different from each other. As described above, the arrangement of the pixels 1a and 1b used to detect irradiation information is not limited to this embodiment, and the number of pixels 1a and 1b or the positions thereof may be changed. For example, combinations of pixels 1a and 1b may be arranged on a specific row at a predetermined interval.

In a pixel row (to be sometimes referred to as an AEC row hereinafter) where the pixels 1a and 1b are arranged, the number of pixels 1 used for a radiation image is smaller than in the other pixel rows. When generating a radiation image, the signals of the pixels 1a and 1b for the image need to be corrected or interpolated using the output values of the pixels 1 on the periphery of the AEC row. Also, in the pixels 1 arranged on the AEC row, signals are repetitively read out from both the pixels 1a and 1b during radiation irradiation. Hence, even for the pixels 1 arranged on the AEC row, correction or interpolation may be needed using the output values of the pixels 1 on the periphery of the AEC row. That is, the radiation image may be generated based on signals output from the pixels 1 arranged on rows other than the pixel row where the pixels 1a and 1b in the plurality of pixels 1 are arranged. In the configuration shown in FIG. 1A, one AEC row is formed in correspondence with the arrangement of the pixels 1a and 1b. In the configurations shown in FIGS. 1B and 1C, two AEC rows are formed. Hence, correction accuracy when generating a radiation image is higher in the structure shown in FIG. 1A because only one AEC row needs correction or interpolation.

Also, in the configuration shown in FIG. 1A, since the pixels 1a and 1b are arranged to be adjacent to each other, the doses of incident radiation are substantially the same. For this reason, since the above-described crosstalk amounts also become substantially the same, the signal derived from crosstalk and superimposed on the signals output from the pixels 1a and 1b can accurately be suppressed. For example, in the arrangements shown in FIGS. 1B and 1C, the number of pixel rows arranged between the pixel row where the pixel 1a is arranged and the pixel row where the pixel 1b is arranged may be 10 or less or 5 or less. Also, the pixels 1a and 1b may be arranged on rows adjacent to each other.

FIG. 2A is a plan view showing an example of the configuration of the pixels 1a and 1b according to this embodiment. FIGS. 2B and 2C are sectional views taken along a line A-A' and a line B-B' in FIG. 2A, respectively. Pixels other than the pixels 1a and 1b in the plurality of pixels 1 can have the same structure as the pixel 1a. In the configuration shown in FIG. 2A, the two pixels 1a and 1b that are adjacent to each other in the row direction and are connected to the common column signal line 3a have a configuration of point symmetry across the common column signal line 3a. However, the present invention is not limited to this. For example, the pixels 1a and 1b may have a configuration of line symmetry across the common column signal line 3a. To make the pixels 1a and 1b have the relationship of line symmetry, for example, the switch elements 21 may be arranged at the center in the column direction. This also applies to the other pixels 1 that are adjacent to each other in the row direction and are connected to the common column signal line 3. In this case, the axis of symmetry may be the center line of the column signal line 3 in the column direction.

In this embodiment, a scintillator (not shown) that generates light according to incident radiation is further provided on the upper side of the sectional views of FIGS. 2B and 2C. The scintillator is arranged to cover the plurality of pixels 1. The light converted by the scintillator is converted into an electric charge by the conversion element 20 and transferred to the column signal line 3 via the switch element 21. That is, the pixel 1 according to this embodiment is an indirect-type element including the scintillator that converts radiation into light detectable by the conversion element 20. However, the direct-type conversion element 20 that directly converts radiation into an electric charge may be used in the pixel 1.

As shown in FIGS. 2A to 2C, in the pixels 1a and 1b, the conversion elements 20, the switch elements 21, and wiring patterns such as the column signal line 3a, the driving lines 6a and 6b, and the bias lines 8 are arranged. In this embodiment, a pin diode is used as the conversion element 20, and the conversion element 20 includes the electrode 111, an impurity semiconductor layer 112, a semiconductor layer 113, an impurity semiconductor layer 114, the electrode 115, and a protective layer 116. In this embodiment, a Thin Film Transistor (TFT) is used as the switch element 21, and the switch element 21 includes a control electrode 101, a main electrode 105 (a source electrode in this embodiment), a main electrode 106 (a drain electrode in this embodiment), an insulating layer 102, a semiconductor layer 103, and an impurity semiconductor layer 104.

The upper electrode of the conversion element 20 is connected to the bias line 8 configured to apply a predetermined bias voltage. The electrode 111 of the conversion element 20 is connected to the main electrode 106 of the switch element 21. The control electrode 101 of the switch element 21 is connected to the driving lines 6a and 6b, and the conductive state/non-conductive state of the switch element 21 is controlled by signals supplied from the driving circuit 10 to the driving lines 6a and 6b. The main electrode 105 of the switch element 21 is connected to the column signal line 3a. If the switch element 21 changes to the conductive state, the electric charge in the conversion element 20 is transferred as an electrical signal to the column signal line 3a.

As the difference between the pixel 1a and the pixel 1b shown in FIGS. 2A to 2C, a light shielding layer 22 is not arranged in the pixel 1a, and the light shielding layer 22 is arranged in the pixel 1b. As shown in FIG. 2C, the light shielding layer 22 is formed using the bias line 8. The light shielding layer 22 has a role of shielding light converted by the scintillator, to which the conversion element 20 has a sensitivity. Hence, the light shielding layer 22 is arranged between the pixel 1b and the scintillator. If the bias line 8 is made of a metal that shields the light generated by the scintillator, the width of the bias line 8 is increased to cover the whole surface of the conversion element 20 of the pixel 1*b*. This makes it possible to form the pixel 1*b* having a lower sensitivity to radiation than the pixel 1*a* without increasing the number of processes. The whole surface of the conversion element 20 is covered to suppress leakage light. However, the present invention is not limited to this, and any configuration can be employed if it changes the sensitivity to radiation between the pixel 1*a* and the pixel 1*b*. For example, the light shielding layer 22 may be a metal layer different from the bias line 8, or a part of the conversion element 20 of the pixel 1*b* may not be covered with the light shielding layer 22. Also, for example, as the light shielding layer, a colored (for example, black) resin may be arranged between the protective layer 116 and the scintillator to cover the conversion element 20 of the pixel 1*b*. Also, if the conversion element 20 is a direct-type conversion element, the conversion element 20 of the pixel 1*b* may be covered by a shielding member using lead or tungsten such that it is difficult for radiation to enter the conversion element 20 of the pixel 1*b*.

As described above, parasitic capacitances that are spatially connected to each other are formed between the electrode 111 of the conversion element 20 and the column signal line 3 (main electrode 105). By the parasitic capacitances, the electrode 111 of the conversion element 20 and the column signal line 3 are capacitively coupled, and crosstalk occurs. Since signals derived from the crosstalk are written from all pixels 1 connected to the column signal line 3, the signal amount is enormous. As a result, it is difficult to correctly read out the signal output from the pixel 1*a* connected to the column signal line 3*a*.

FIG. 3 is a timing chart showing the operation of the radiation imaging apparatus 100 when the detection circuit 13 detects the irradiation information of radiation separately from a radiation image. "Vg1" indicates a signal Vg1 input to the driving line 6*a* to drive the pixel 1*a*. When the signal Vg1 is activated (H), the switch element 21 of the pixel 1*a* is driven and changes to the conductive state, and a signal is thus read out from the pixel 1*a*. "Vg2" indicates a signal Vg2 input to the driving line 6*b* to drive the pixel 1*b*. When the signal Vg2 is activated (H), the switch element 21 of the pixel 1*b* is driven and changes to the conductive state, and a signal is thus read out from the pixel 1*b*. "SH" indicates a sample-and-hold operation. When the signal SH is activated (H), the sample-and-hold operation is performed. "RES" indicates a reset operation of resetting an electric charge accumulated in the column signal line 3 or elements arranged in the readout circuit 12. When the signal RES is activated (H), the reset operation is performed. "Output1" indicates a signal read out from the pixel 1*a* by the readout circuit 12 and transferred to the detection circuit 13. "Output2" indicates a signal read out from the pixel 1*b* by the readout circuit 12 and transferred to the detection circuit 13. "Out" is a signal representing the difference (Output1-Output2) between the signal Output1 according to the signal output from the pixel 1*a* and the signal Output2 according to the signal output from the pixel 1*b*. The signal Out can be calculated using the signals Output1 and Output2 by, for example, the arithmetic circuit 2 of the detection circuit 13. The detection circuit 13 detects the irradiation information of radiation based on the signal Out.

Before radiation irradiation is started, the driving circuit 10 sequentially activates the signals Vg1 and Vg2 to drive the pixels 1*a* and 1*b*. Thus, the detection circuit 13 can detect the start of radiation irradiation. Signals output when the pixels 1*a* and 1*b* are driven before the start of radiation irradiation include offset components generated in the transistors and the like arranged in the pixels 1*a* and 1*b* and the readout circuit 12. Hence, if radiation irradiation is not being performed, the amount of the signal Output1 according to the signal output from the pixel 1*a* and the amount of the signal Output2 according to the signal output from the pixel 1*b* are substantially equal, and the signal Out that is the difference output becomes substantially zero.

If radiation irradiation is started, an electric charge according to the incident radiation is generated in the pixel 1*a*. On the other hand, since the pixel 1*b* is shielded from light, an electric charge corresponding to an offset component is generated, like before the start of radiation irradiation. If the driving circuit 10 sequentially activates the signals Vg1 and Vg2, the readout circuit 12 transfers the signal Output1 according to the signal read out from the pixel 1*a* and the signal Output2 according to the signal read out from the pixel 1*b* sequentially to the detection circuit 13. The detection circuit 13 acquires the signal Out that is the difference between the signal Output1 and the signal Output2. Since a signal derived from the offset component or crosstalk is suppressed in the signal Out, as described above, the detection circuit 13 can obtain the irradiation information of radiation from the signal Out at a high accuracy. For example, the detection circuit 13 can accurately detect the start of radiation irradiation from the signal Out.

In addition, it is also possible to accurately read out the dose of incident radiation from the signal Out, and the detection circuit 13 can accurately acquire the integrated dose. Hence, the radiation imaging apparatus 100 can accurately execute AEC. During radiation irradiation, when reading out signals from the pixels 1*a* and 1*b*, signals derived from crosstalk generated in the column signal line 3*a* are superimposed on the signals output from the pixels 1*a* and 1*b*, and the signal values become larger as compared to a case where radiation irradiation is not performed. However, the amount of the signal of crosstalk in the signal output from the pixel 1*a* and the amount of the signal of crosstalk in the signal output from the pixel 1*b* are substantially the same because the signals are read out temporally substantially during the same period. As a result, if the signal Output2 according to the signal read out from the pixel 1*b* is subtracted from the signal Output1 according to the signal read out from the pixel 1*a*, the influence of the signal of crosstalk superimposed on the signals read out from the pixels 1*a* and 1*b* can be suppressed.

In the radiation imaging apparatus 100, after the start of radiation irradiation or execution of AEC or the like, the detection circuit 13 may stop control for detecting irradiation information. For example, when executing AEC, the radiation imaging apparatus 100 predicts the cumulative dose of radiation from irradiation information detected by the detection circuit 13, and predicts the stop timing of radiation. Next, when the radiation imaging apparatus 100 outputs the information of the predicted stop timing or information representing the stop of radiation irradiation to a control device for controlling the radiation source, the detection circuit 13 may stop control for detecting irradiation information. Furthermore, in the driving circuit 10 or the readout circuit 12, operation preparation for reading out the signal for a radiation image from each pixel 1 may be started.

In this way, when detecting the irradiation information of radiation separately from the radiation image, the driving circuit 10 drives the pixels 1*a* and 1*b* connected to the common column signal line 3 at timings different from each other. Also, the detection circuit 13 detects the irradiation information based on the signal Output1 according to the signal output from the pixel 1*a* and the signal Output2 according to the signal output from the pixel 1b. This makes it possible to suppress the influence of an offset or crosstalk superimposed on the signals output from the pixels 1a and 1b and accurately obtain the irradiation information of radiation while suppressing the circuit scale of the readout circuit 12. As a result, in the radiation imaging apparatus 100, control for AEC can more accurately be executed, and the radiation imaging apparatus 100 with higher usability for the user is implemented.

Figure 4:
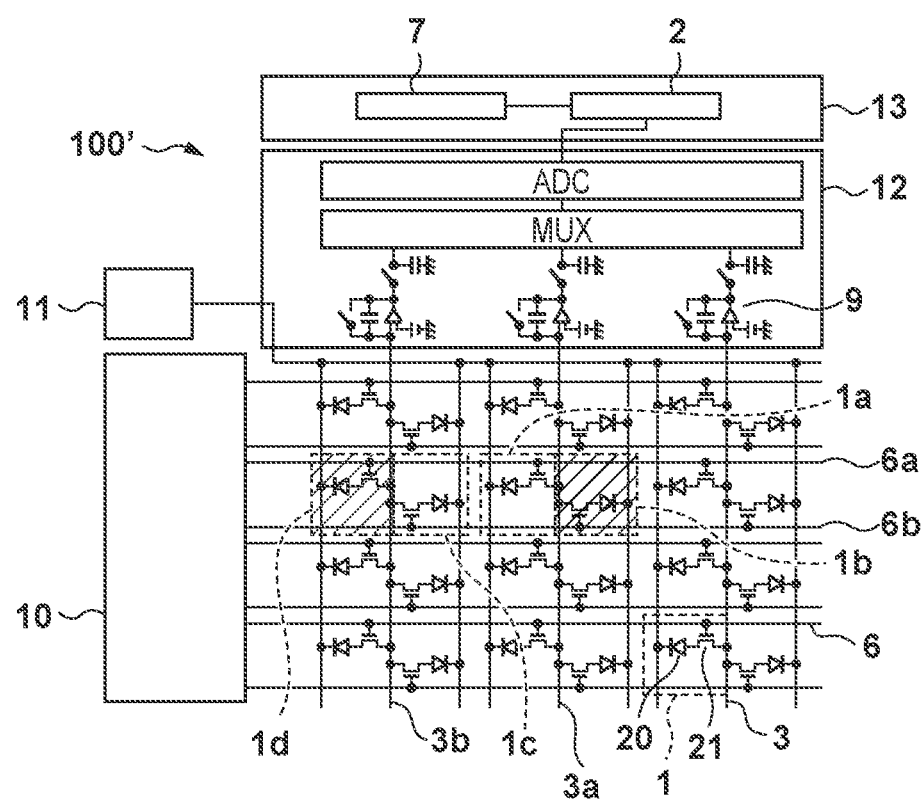
FIG. 4 is a view showing a modification of the radiation imaging apparatus shown in FIG. 1A.

FIG. 4 is an equivalent circuit diagram showing a radiation imaging apparatus 100' according to a modification of the radiation imaging apparatus shown 100 in FIG. 1A. In the radiation imaging apparatus 100' shown in FIG. 4, pixels used to allow the detection circuit 13 to obtain the irradiation information of radiation are four pixels including pixels 1c and 1d in addition to the above-described pixels 1a and 1b. Except that the number of pixels used to allow the detection circuit 13 to obtain the irradiation information of radiation is different, the radiation imaging apparatus 100' may be the same as the above-described radiation imaging apparatus 100. Differences from the radiation imaging apparatus 100 will mainly be described below, and a description of components that can be similar to those in the radiation imaging apparatus 100 will appropriately be omitted.

In the radiation imaging apparatus 100', the sensitivities of the pixels 1c and 1d to radiation are different from each other. A description will be made here assuming that the pixel 1d has a lower sensitivity to radiation than the pixel 1c. For example, the pixel 1c may have the same configuration as the above-described pixel 1a, and the pixel 1d may have the same configuration as the above-described pixel 1b. For example, in the pixels 1a and 1c, the light shielding layer 22 may not be arranged between the scintillator and the conversion element 20, and in the pixels 1b and 1d, the light shielding layer 22 may be arranged between the scintillator and the conversion element 20. Also, in this case, pixels other than the pixels 1a to 1d in the plurality of pixels 1 may have the same configuration as the pixels 1a and 1c.

The pixels 1c and 1d are connected to a column signal line 3b different from the column signal line 3a in the plurality of column signal lines 3, and are connected to the driving lines 6a and 6b different from each other in the plurality of driving lines 6, respectively. In the configuration shown in FIG. 4, the pixel 1d is connected to the same driving line 6a as the pixel 1a in the plurality of driving lines 6, and the pixel 1c is connected to the same driving line 6b as the pixel 1b in the plurality of driving lines 6. However, the present invention is not limited to this, and the driving circuit 10 need only be able to drive the pixels 1c and 1d at timings different from each other. On the other hand, as will be indicated by an operation to be described later, to improve time resolution, the driving circuit 10 may be configured to drive the pixels 1a and 1d at the same timing and drive the pixels 1b and 1c at the same timing. However, the present invention is not limited to this, and the pixels 1a to 1d may be driven at different timings. If the pixels 1a and 1b can output signals at timings different from each other, and the pixels 1c and 1d can output signals at timings different from each other, the irradiation information of radiation can accurately be obtained, as described above.

In the configuration shown in FIG. 4, when the driving line 6a is activated, signals are simultaneously transferred from the pixels 1a and 1d to the readout circuit 12. When the driving line 6b is activated, signals are simultaneously transferred from the pixels 1b and 1c to the readout circuit 12. In this case, the difference between the signals output from the combination of the pixels 1a and 1b and the difference between the signals output from the combination of the pixels 1c and 1d are alternately acquired. This can make the time resolution for acquiring the irradiation information of radiation by the detection circuit 13 twice larger than the operation shown in FIG. 3 without changing the clock rate. For example, if the output of the radiation source is small, and a signal according to radiation irradiation gradually becomes large, signal readout from the pixel 1a and signal readout from the pixel 1b are performed at close timings but not simultaneously. For this reason, the amounts of crosstalk may be different, and the accuracy of irradiation information detection may lower. In this case, lowering of the accuracy of irradiation information detection can be suppressed by improving the time resolution.

Figure 5:
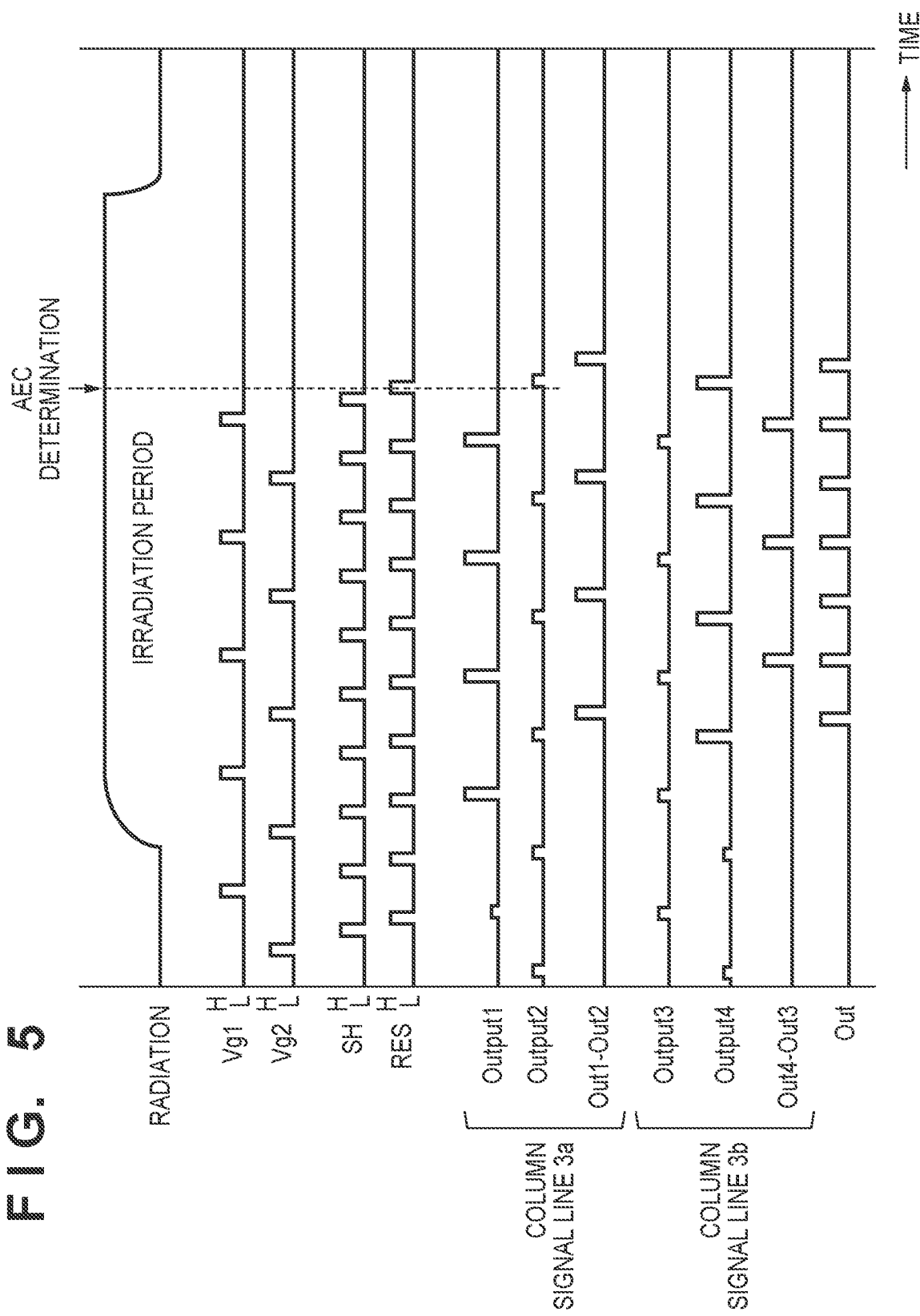
FIG. 5 is a timing chart showing an example of the operation of the radiation imaging apparatus shown in FIG. 4.

FIG. 5 is a timing chart showing the operation of the radiation imaging apparatus 100 when the detection circuit 13 detects the irradiation information of radiation separately from a radiation image. "Vg1", "Vg2", "SH", and "RES" are similar to those in FIG. 3. "Output1" of the column signal line 3a is a signal read out from the pixel 1a by the readout circuit 12 and transferred to the detection circuit 13, and "Output2" of the column signal line 3a is a signal read out from the pixel 1b by the readout circuit 12 and transferred to the detection circuit 13. These are similar to "Output1" and "Output2" in FIG. 3. "Out1-Out2" of the column signal line 3a is a signal representing the difference (Output1-Output2) between the signal Output1 according to the signal output from the pixel 1a and the signal Output2 according to the signal output from the pixel 1b. "Output3" of the column signal line 3b is a signal read out from the pixel 1d by the readout circuit 12 and transferred to the detection circuit 13, and "Output4" of the column signal line 3b is a signal read out from the pixel 1c by the readout circuit 12 and transferred to the detection circuit 13. "Out4-Out3" of the column signal line 3b is a signal representing the difference (Output4-Output3) between the signal Output3 according to the signal output from the pixel 1c and the signal Output4 according to the signal output from the pixel 1d. "Out" is a signal obtained by superimposing "Out1-Out2" and "Out4-Out3". The signal Out1-Out2, the signal Out4-Out3, and the signal Out can be calculated using the signals Output1 to Output4 by, for example, the arithmetic circuit 2 of the detection circuit 13. The detection circuit 13 detects the irradiation information of radiation based on the signal Out.

The pixel 1a (pixel 1d) and the pixel 1b (pixel 1c) may have different overlap capacitances or parasitic capacitances because of the different transistor arrangement or a misalignment in the exposure apparatus. For this reason, the offset components of the pixel 1a (pixel 1d) and the pixel 1b (pixel 1c) may also be different. In this case, offset component correction may be insufficient in the signal Out1-Out2 (signal Out4-Out3), and it may be impossible to detect the irradiation information of radiation at a high accuracy. Hence, for example, offset data acquired without performing radiation irradiation in advance is necessary. However, the offset components can be corrected at a high accuracy by superimposing the signal Out1-Out2 and the signal Out4-Out3.

Figure 6:
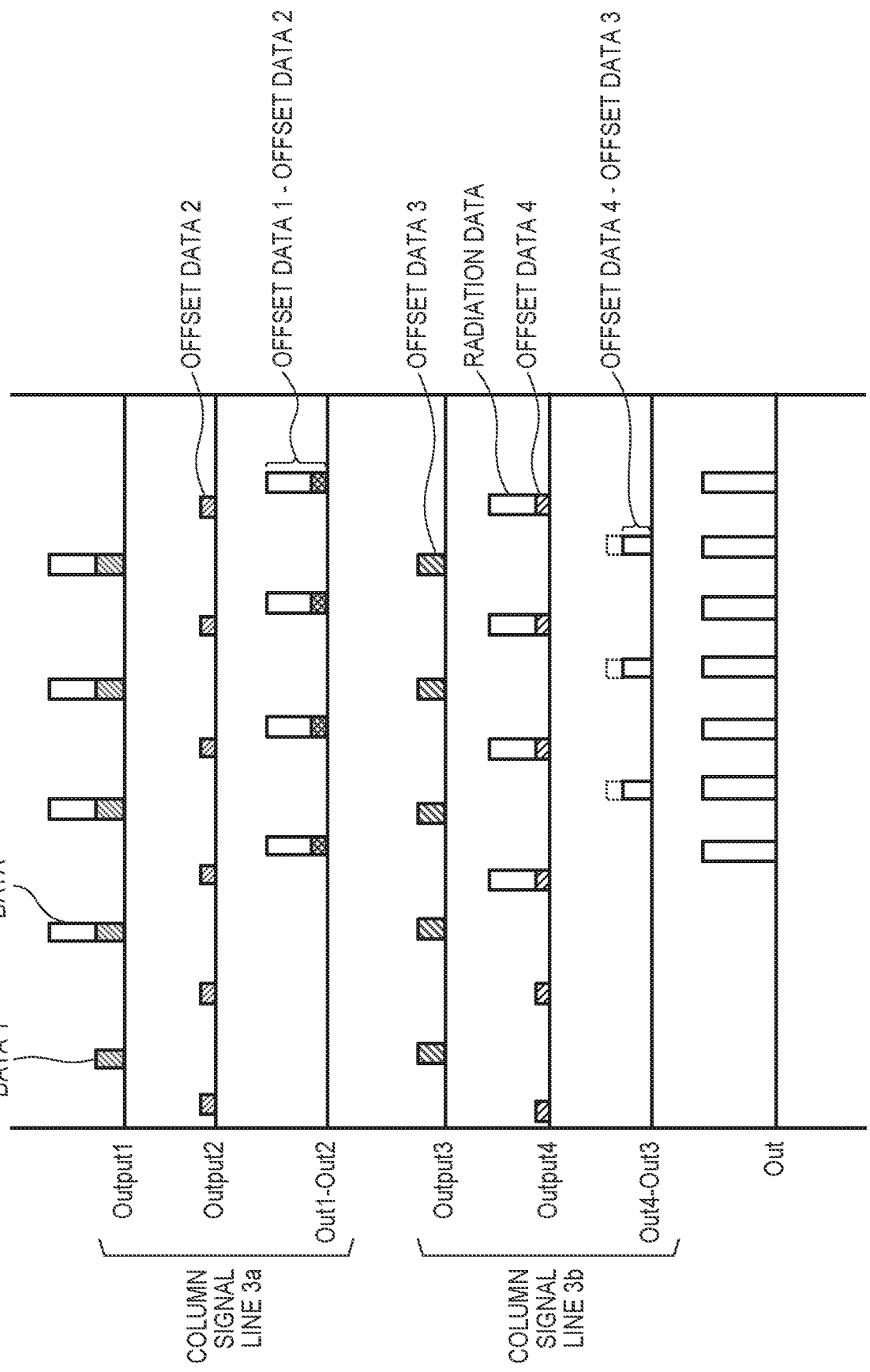
FIG. 6 is a view showing an example of correction of the radiation imaging apparatus shown in FIG. 4.

FIG. 6 is a view showing an example of operations and correction of the signals Output1 to Output4 output from the pixels 1a to 1d shown in FIG. 4. If radiation irradiation is not performed, offset data 1 (4) is output as the signal Output1 (Output4) from the pixel 1a (1c). On the other hand, if radiation irradiation is performed, the signal Output1 (Output4) is an output obtained by adding offset data 1 (4) to radiation data. Since the pixel 1b (1d) is shielded from light, an electric charge corresponding to radiation is not generated, and offset data 2 (3) is output as the signal Output2 (Output3) from the pixel 1b (1d).

In the configuration shown in FIG. 4, since a misalignment may occur in an almost similar way in the pixels 1a and 1d, arrangements such as overlap of metal layers are almost the same except the light shielding layer. For this reason, offset data 1 and offset data 3 have almost the same value. Offset data 2 of the pixel 1b and offset data 4 of pixel 1c have almost the same value, like the relationship between the pixel 1a and the pixel 1d. As shown in FIG. 6, if offset data 1 (3) is larger than offset data 2 (4), the signal Out1-Out2 is an output obtained by adding the difference between offset data 1 and offset data 2 to radiation data. In addition, the signal Out4-Out3 is an output obtained by subtracting the difference between offset data 3 and offset data 4 from radiation data. However, when the signal Out1-Out2 and the signal Out4-Out3 are added, the difference between offset data 1 and offset data 2 and the difference between offset data 3 and offset data 4, which are uncorrectable, are canceled, and information with the radiation data of the pixels 1a and 1c added can be acquired. As a result, the irradiation information of radiation can be detected at a high accuracy.

The acquisition of the signal Out is not limited to the above-described operation and correction method if the difference between the offset components of the pixel 1a (pixel 1d) and the pixel 1b (pixel 1c) can be corrected. For example, the signal Out3-Out4 (Output3-Output4) is acquired as the difference between the signal Output3 according to the signal output from the pixel 1c and the signal Output4 according to the signal output from the pixel 1d. In this case, the difference between the offset components of the pixel 1a (pixel 1d) and the pixel 1b (pixel 1c) can accurately be corrected based on the difference between the signal Out1-Out2 and the signal Out3-Out4.

The detection circuit 13 acquires, as the signal Out, the difference between the signals output from the combination of the pixels 1a and 1b and the combination of the pixels 1c and 1d, which are connected to the two column signal lines 3a and 3b. In this case, the signals are alternately read out from the pixels 1a and 1c having a high sensitivity (from the pixels 1b and 1d having a low sensitivity). The readout circuit 12 alternately transfers, to the detection circuit 13, the signal Output1 (signal Output2) according to the signal read out from the pixel 1a (pixel 1b) and the signal Output3 (signal Output4) according to the signal read out from the pixel 1c (pixel 1d). Thus, the detection circuit 13 can alternately obtain the signal Out1-Out2 and the signal Out4-Out3. As a result, as compared to the operation shown in FIG. 3, the signal Out used by the detection circuit 13 to detect the irradiation information of radiation can be obtained at a twice larger time resolution at the same clock rate. This makes it possible to suppress the influence of an offset or crosstalk superimposed on the signals output from the pixels 1a to 1d, improve the time resolution, and accurately obtain the irradiation information of radiation while suppressing the circuit scale of the readout circuit 12. As a result, control for AEC can more accurately be executed, and the radiation imaging apparatus 100' with higher usability for the user is implemented.

In the configuration shown in FIG. 4, the pixels 1a to 1d are connected to the column signal lines 3a and 3b adjacent to each other. However, the present invention is not limited to this, and one or more column signal lines 3 may be arranged between the column signal line 3a and the column signal line 3b. Also, in the configuration shown in FIG. 4, the pixels 1a to 1d are arranged on one pixel row (AEC row).

As described above, the radiation image may be generated based on signals output from the pixels 1 arranged on rows other than the pixel row where the pixels 1a to 1d in the plurality of pixels 1 are arranged. Hence, if the pixels 1a to 1d are arranged on the same pixel row, the number of AEC rows to be corrected or interpolated becomes small, and therefore, correction accuracy when generating a radiation image becomes high. However, the present invention is not limited to this, and the positions to arrange the pixels 1a to 1d can appropriately be selected. The pixels 1c and 1d may be arranged on the same column, like the pixels 1a and 1b described with reference to FIGS. 1B and 1C, or may be arranged on rows different from each other and on columns different from each other. The pixels 1a to 1d may be arranged on different rows.

Also, in the configurations shown in FIGS. 1A to 1C and 4, a pair of pixels 1a and 1b (pixels 1c and 1d) having sensitivities different from each other is arranged on one column signal line 3. However, the present invention is not limited to this. A plurality of pairs of pixels 1a and 1b may be arranged on one column signal line 3. In this case, signals may be read out from the plurality of pixels 1a (pixels 1b) connected to one column signal line 3 by simultaneously driving the switch elements 21 (analog addition). Alternatively, for example, signals may be read out from the plurality of pixels 1a (pixels 1b) connected to one column signal line 3 at timings different from each other, and the signal values may be integrated by the arithmetic circuit 2 of the detection circuit 13 (digital addition).

Figure 7:
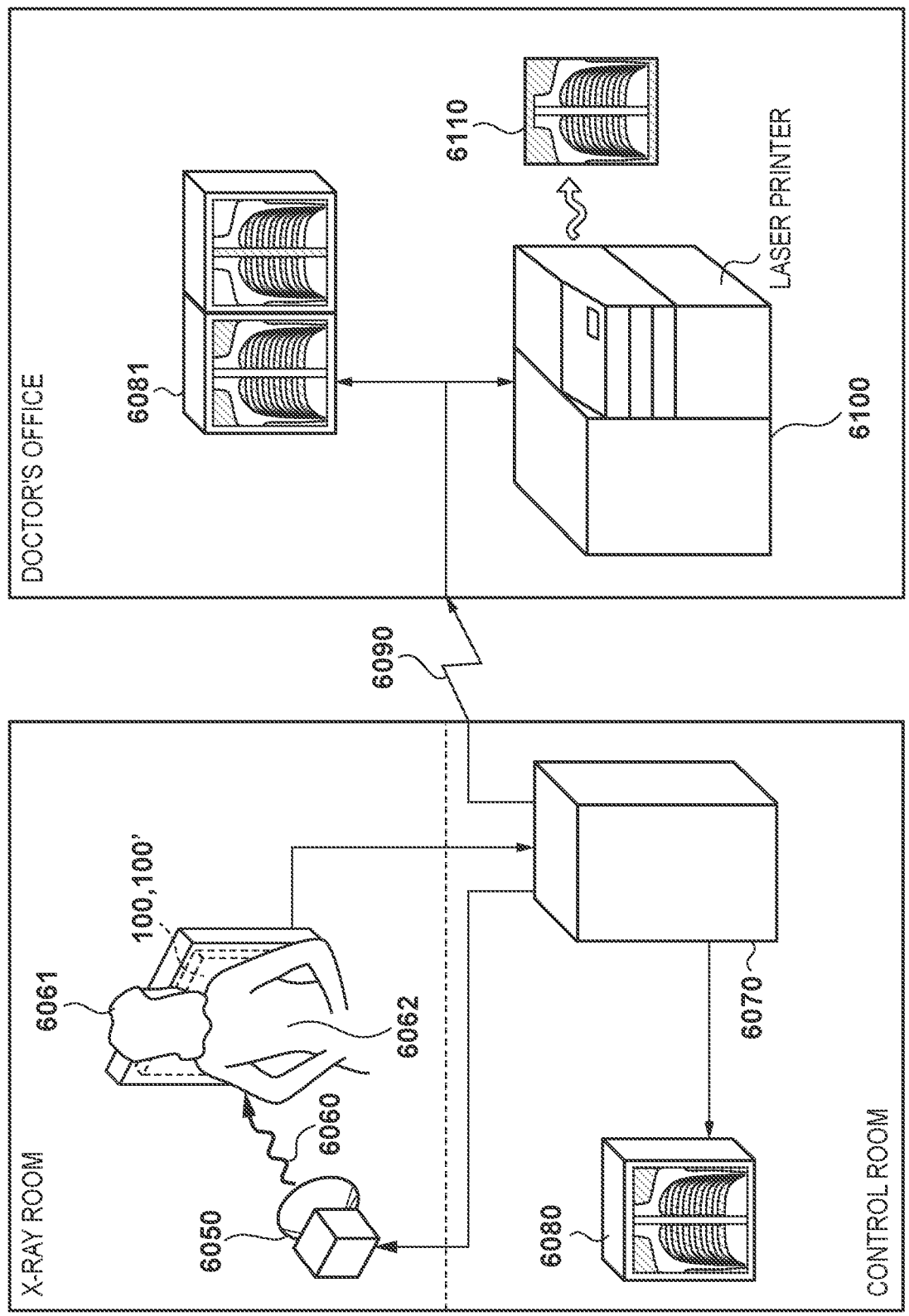
FIG. 7 is a view showing an example of the configuration of a radiation imaging system using the radiation imaging apparatuses shown in FIGS. 1A to 1C and 4.

A radiation imaging system incorporating the above-described radiation imaging apparatus 100 or 100' will exemplarily be described below with reference to FIG. 7. X-rays 6060 generated by an X-ray tube 6050 serving as a radiation source for emitting radiation to the radiation imaging apparatus 100 or 100' pass through a chest 6062 of a patient or object 6061 and enter the radiation imaging apparatus 100 or 100'. The incident X-rays include the internal body information of the patient or object 6061. In the radiation imaging apparatus 100 or 100', a scintillator emits light in correspondence the entry of the X-rays 6060, and the emitted light is photoelectrically converted by the conversion elements 20 to obtain electrical information. This information is converted into digital data, undergoes image processing by an image processor 6070 serving as a signal processing unit, and can be observed on a display 6080 serving as a display unit in a control room.

Also, this information can be transferred to a remote place by a transmission processing unit such as a telephone network 6090. This allows the information to be displayed on a display 6081 serving as a display unit in a doctor's office or the like in another place, and allows a doctor who is in a remote place to make a diagnosis. In addition, the information can be recorded on a recording medium such as an optical disk, and a film processor 6100 can also record the information on a film 6110 serving as a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-022306, filed Feb. 16, 2022 and Japanese Patent Application No. 2023-009593, filed Jan. 25, 2023, which are hereby incorporated by reference herein in their entirety.

What is claimed is:

1. A radiation imaging apparatus comprising:
a plurality of pixels arranged to form a plurality of rows and a plurality of columns;
a driving circuit configured to control the plurality of pixels via a plurality of driving lines extending in a row direction;
a readout circuit configured to read out, via a plurality of column signal lines, signals generated by the plurality of pixels; and
a detection circuit configured to detect irradiation information of radiation separately from a radiation image based on the signals read out by the readout circuit,
wherein each of the plurality of column signal lines is connected to pixels arranged on two pixel columns adjacent to each other in the row direction in the plurality of pixels,
the plurality of pixels include a first pixel and a second pixel, whose sensitivities to radiation are different from each other,
the first pixel and the second pixel are connected to a common column signal line in the plurality of column signal lines, and are connected to driving lines different from each other in the plurality of driving lines, and
when detecting the irradiation information,
the driving circuit is configured to drive the first pixel and the second pixel at timings different from each other, and
the detection circuit is configured to detect the irradiation information based on a signal output from the first pixel and a signal output from the second pixel.

2. The apparatus according to claim 1, wherein when detecting the irradiation information, the detection circuit is configured to detect the irradiation information based on a difference between the signal output from the first pixel and the signal output from the second pixel.

3. The apparatus according to claim 1, wherein in the plurality of pixels, two pixels that are adjacent to each other in the row direction and are connected to the common column signal line have a configuration of line symmetry or point symmetry across the common column signal line.

4. The apparatus according to claim 1, wherein the first pixel and the second pixel are arranged on the same row.

5. The apparatus according to claim 1, wherein the first pixel and the second pixel are arranged on the same column.

6. The apparatus according to claim 1, wherein the first pixel and the second pixel are arranged on rows different from each other and on columns different from each other.

7. The apparatus according to claim 1, wherein
the plurality of pixels include a third pixel and a fourth pixel, whose sensitivities to radiation are different from each other,
defining the common column signal line as a first column signal line,
the third pixel and the fourth pixel are connected to a second column signal line different from the first column signal line in the plurality of column signal lines, and are connected to driving lines different from each other in the plurality of driving lines, and
when detecting the irradiation information,
the driving circuit is configured to drive the third pixel and the fourth pixel at timings different from each other, and
the detection circuit is configured detect the irradiation information further based on a signal output from the third pixel and a signal output from the fourth pixel.

8. The apparatus according to claim 7, wherein when detecting the irradiation information, the driving circuit is configured to drive the first pixel and the third pixel at the same timing, and is configured to drive the second pixel and the fourth pixel at the same timing.

9. The apparatus according to claim 3, wherein
the plurality of pixels include a third pixel and a fourth pixel, whose sensitivities to radiation are different from each other,
defining the common column signal line as a first column signal line,
the third pixel and the fourth pixel are connected to a second column signal line different from the first column signal line in the plurality of column signal lines,
the third pixel is connected to the same driving line as the first pixel in the plurality of driving lines,
the fourth pixel is connected to the same driving line as the second pixel in the plurality of driving lines, and
when detecting the irradiation information, the detection circuit is configured to detect the irradiation information further based on a signal output from the third pixel and a signal output from the fourth pixel.

10. The apparatus according to claim 7, wherein when detecting the irradiation information, the detection circuit is configured to detect the irradiation information further based on a difference between the signal output from the third pixel and the signal output from the fourth pixel.

11. The apparatus according to claim 10, wherein when detecting the irradiation information, the detection circuit is configured to detect the irradiation information based on a difference between the signal output from the first pixel and the signal output from the second pixel and a difference between the signal output from the third pixel and the signal output from the fourth pixel.

12. The apparatus according to claim 7, wherein
the first pixel has a higher sensitivity to radiation than the second pixel, and
the third pixel has a lower sensitivity to radiation than the fourth pixel.

13. The apparatus according to claim 7, wherein the radiation image is generated based on signals output from pixels arranged on pixel rows other than the pixel row where the first pixel, the second pixel, the third pixel, and the fourth pixel are arranged in the plurality of pixels.

14. The apparatus according to claim 7, further comprising:
a scintillator arranged to cover the plurality of pixels; and
a light shielding layer arranged between the second pixel and the scintillator and between the fourth pixel and the scintillator.

15. The apparatus according to claim 1, wherein the radiation image is generated based on signals output from pixels arranged on pixel rows other than the pixel row where the first pixel and the second pixel are arranged in the plurality of pixels.

16. The apparatus according to claim 1, further comprising:
a scintillator arranged to cover the plurality of pixels; and
a light shielding layer arranged between the second pixel and the scintillator.

17. A radiation imaging system comprising:
the radiation imaging apparatus according to claim 1; and
a signal processing unit configured to process a signal output from the radiation imaging apparatus.

* * * * *